United States Patent
Yang et al.

(10) Patent No.: US 7,688,395 B2
(45) Date of Patent: Mar. 30, 2010

(54) OPTICAL FILM ASSEMBLY, AS WELL AS BACKLIGHT MODULE AND LCD APPARATUS COMPRISING THE SAME

(75) Inventors: Tun-Chun Yang, Hsinchu (TW); Chih-Jen Hu, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 5 days.

(21) Appl. No.: 11/876,253

(22) Filed: Oct. 22, 2007

(65) Prior Publication Data

US 2008/0192502 A1    Aug. 14, 2008

(30) Foreign Application Priority Data

Feb. 9, 2007    (TW) ................ 96104786 A

(51) Int. Cl.
*G02F 1/1335* (2006.01)
(52) U.S. Cl. ......................... 349/57; 349/96
(58) Field of Classification Search .......... 349/65, 349/96, 57
See application file for complete search history.

(56) References Cited

U.S. PATENT DOCUMENTS 6,853,413 B2 *   2/2005   Larson ................ 349/96
2005/0270766 A1   12/2005  Kung et al.
2006/0077316 A1 *  4/2006  Chi et al. .................. 349/65
2006/0098452 A1    5/2006  Choi et al.

FOREIGN PATENT DOCUMENTS

| CN | 1601347 | 3/2005 |
|---|---|---|
| CN | 1721952 | 1/2006 |
| CN | 1841151 | 10/2006 |

OTHER PUBLICATIONS

English language translation of abstract and pertinent parts of CN 1841151.

* cited by examiner

*Primary Examiner*—Frank G Font
*Assistant Examiner*—Eric Wong
(74) *Attorney, Agent, or Firm*—Thomas, Kayden, Horstemeyer & Risley

(57) ABSTRACT

An optical film for use in backlight module is provided. The optical provides quality luminance of a liquid crystal display (LCD) apparatus. The optical film assembly comprises a substrate with a polarization direction, in which the substrate has a first surface and a second surface opposing thereto. A first prismatic structure is formed on the first surface. The polarization direction of the substrate defines the first angle $\theta_1$ with respect to the configured direction of the first prismatic structure, in which $0° < \theta_1 < 180°$.

12 Claims, 3 Drawing Sheets

OPTICAL FILM ASSEMBLY, AS WELL AS BACKLIGHT MODULE AND LCD APPARATUS COMPRISING THE SAME

This application claims the benefit from the priority of Taiwan Patent Application No. 096104786 filed on Feb. 9, 2007, the disclosures of which are incorporated by reference herein in their entirety.

CROSS-REFERENCES TO RELATED APPLICATIONS

Not applicable.

BACKGROUND OF THE INVENTION

1. Field of the Invention

The subject invention relates to an optical film assembly. Specifically, it relates to an optical film assembly of the backlight module in a liquid crystal display (LCD) apparatus.

2. Descriptions of the Related Art

Compared to other flat-panel display apparatuses, the LCD has low battery usage, is lightweight, and has high luminance. The LCD has been used with various technological developments, such as mobile phones, laptops, liquid crystal televisions, and digital cameras. Generally, the LCD apparatus comprises a section for controlling the liquid crystals and a section for providing uniform light. The section that controls the liquid crystals adjusts the light transmittance of the liquid crystals. The section that provides uniform light (i.e., the so-called backlight module) comprises a light source and an optical member for improving the characteristics of the light generated from the light source.

An LCD apparatus should have the following qualities: high luminance, high uniformity, and high contrast. To improve the brightness (luminance) of the backlight module in the LCD apparatus, the light is first directed by a light guide plate (LGP) and then is passed through additional film materials, thereby, enhancing the entire optical performance of the liquid crystal panel. The film material comprises diffusion films, brightness enhancement films (BEFs), dual brightness enhancement films (DBEFs), and polarization converters. The BEF with a prismatic structure on its surface is called a prismatic film. The DBEF is normally defined as a BEF with polarization and reflection functions.

Taiwan Patent Publication No. M289869 discloses a backlight module comprising film materials such as a diffusion plate, a prismatic film, and an upper diffusion film, in addition to a LGP, a light source, and a reflector. Depicted as the conventional backlight module 100 in FIG. 1, the prior art typically uses a first prismatic film 130 with a prismatic structure 131 on its surface, a second prismatic film 140 with a prismatic structure 141 on its surface (in which the configured directions of the prismatic structures 141 and 131 are perpendicular to each other), and an enhanced polarization converter 150 with a polarization direction 151 deposited above the LGP 110 and diffusion layer 120. The converter 150 is typically used with the lower polarizer (not depicted) of the LCD panel. Alternatively, the prior technology has also proposed a backlight module 200 depicted in FIG. 2. Particularly, a DBEF 250 with a polarization direction 251 is used instead of the enhanced polarization converter 150 shown in FIG. 1.

However, the usage of too many film materials will not only reduce light transmission, but it will also increase the thickness of the films, which influences the special use of the backlight module, resulting in an unstable elemental assembly. Because of this drawback, other integration ways have been proposed. For example, a DEBF is combined with a BEF with a prismatic structure on its surface (a prismatic film) to thin the film materials. When liquid crystals are used however, the polarization direction of the DBEF is always designed to be the same as the configured direction of the prismatic structure on the BEF. Under such circumstances, there will be high luminance from certain visual angle regions and low luminance from other visual angle regions, and thus, there will be a significant difference between luminance in difference regions, especially in the on-axis viewing locus. The on-axis viewing locus refers to the cross-locus of the X and Y axes which is swept by the observer's eyes during the panel luminance test. In the panel luminance test, the observer views the panel luminance in a direction perpendicular to the panel center (i.e., the direction parallel to the normal line of the panel) and then respectively tiles the specific angles to the right side (i.e., positive X axial direction), the left side (i.e., negative X axial direction), the upper side (i.e., positive Y axial direction), and the lower side (i.e., negative Y axial direction). The cross-locus is the region mainly viewed by users, and thus, the display manufacturers always conduct the luminance test in this region.

In particular, the entire luminance of the cross-locus viewed by users is extremely uneven. As shown in FIG. 3, each color level (gray level) in the right color bar represents the different strength in luminance where the lowest one refers to the lowest luminance and the highest one refers to the highest luminance. All the color levels (gray levels) correspond to the test results of the luminance shown in the left chart of FIG. 3. For example, in the positive X axial direction of the cross-locus, the luminance observed from position $P_0$ perpendicular to the panel center was first measured. Then, the observer tiled his/her head with angles 15°, 30°, and 45° from the $P_0$ to the right (i.e., the positive X axial direction) to get the positions $P_{15}$, $P_{30}$, and $P_{45}$, respectively, and measured the luminance. The color levels (gray levels) measured at the positions $P_0$, $P_{15}$, $P_{30}$, and $P_{45}$ correspond to those marked by $B_0$, $B_{15}$, $B_{30}$, and $B_{45}$, respectively, on the right color bar. The test charts show that there is an extreme difference in luminance between the positions represented by $B_0$ and $B_{45}$ (i.e., the position perpendicular to the panel center and the position defining a 45° angle with respect thereto).

Consequently, the subject invention provides an optical film assembly which can prevent the abovementioned drawbacks of the prior art. Moreover, the optical film assembly can be used together with liquid crystals to exhibit better and more uniform optical performance at each visual angle.

SUMMARY OF THE INVENTION

One objective of the subject invention is to provide an optical film assembly comprising a substrate and a prismatic structure on its surface, wherein the substrate has a polarization direction different from the configured direction of the prismatic structure.

Another objective of the subject invention is to provide a backlight module comprising a forgoing optional film assembly, a diffusion layer, a light guide plate (LGP) and a light source.

Yet a further objective of the subject invention is to provide a liquid crystal display (LCD) apparatus comprising a LCD panel, a forgoing optical film assembly, a diffusion layer, a light guide plate (LGP), and a light source.

After reviewing the conditions for carrying out the procedures as described below, persons having ordinary skill in the art can easily understand the basic spirit and other inventive objectives of the subject invention as well as the technical means and preferred embodiments implemented for the subject invention.

DESCRIPTION OF THE PREFERRED EMBODIMENT

Figure 1:
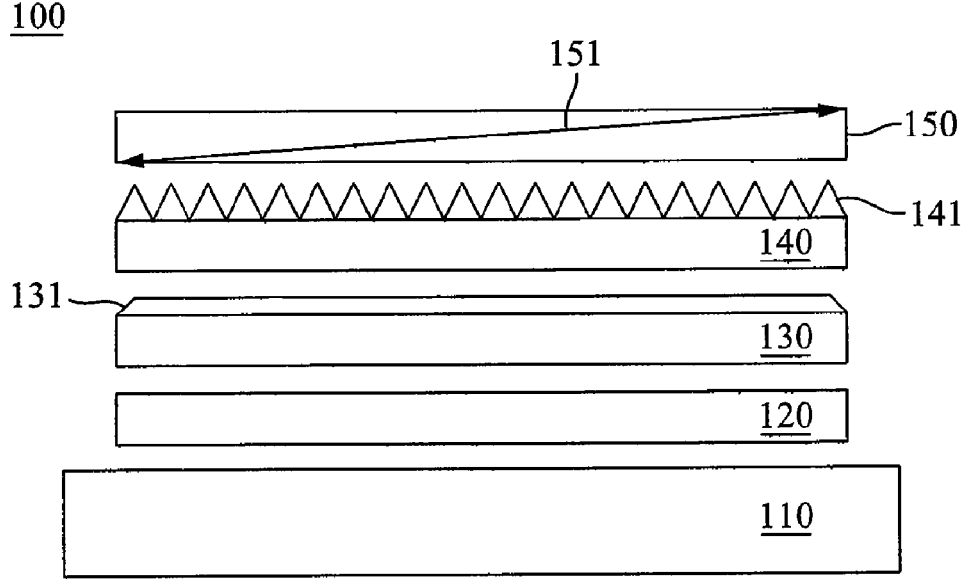
FIG. 1 is a schematic diagram of a combination of optical films in a backlight module according to the prior art.
Figure 2:
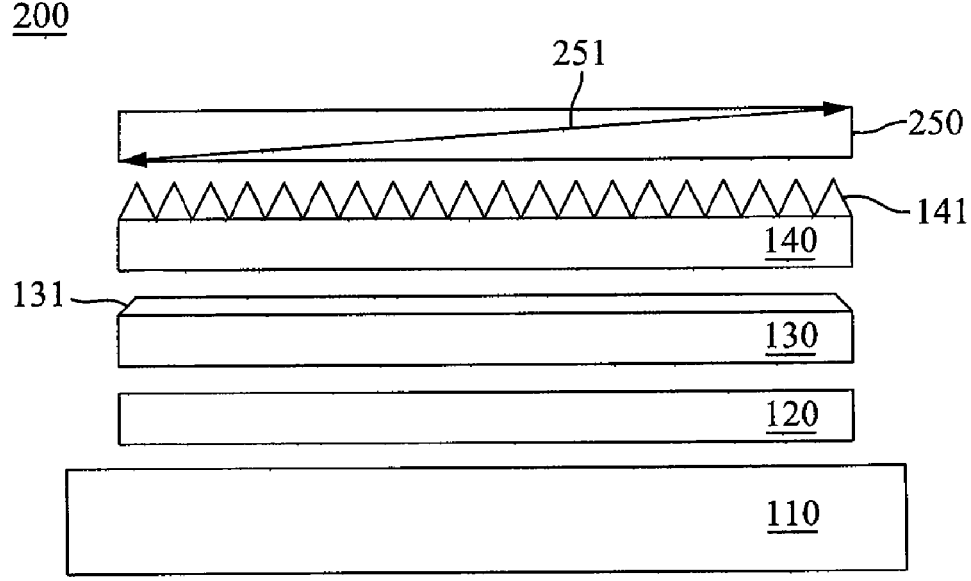
FIG. 2 is a schematic diagram of another combination of optical films in a backlight module according to the prior art.

The optical film assembly of the subject invention comprises a substrate and a first prismatic structure. The substrate has a polarization direction, a first surface and a second surface. The first prismatic structure is formed on the first surface with a configured direction different from the polarization direction. The two directions define a first angle $\theta_1$, in which $0° < \theta_1 < 180°$.

Unless it is described specifically, the angle referred to in the subject application is the angle obtained by measuring the configured direction clockwise with respect to the polarization direction of the substrate.

According to the subject invention, the first angle $\theta_1$ falls between 0° and 180°, preferably between 5° and 175°. The angle will change depending on the application of the display, and thus, is not limited to a specific angle. For example, in the case of transmission LCDs, the first angle $\theta_1$ is normally 45° or 135°; in the case of transflective LCDs, the first angle $\theta_1$ varies depending on the specification and demand of products. However, the angle design should be considered in enhancing the visual angle luminance of the entire panel.

Furthermore, any materials with a polarization effect and capable of being used in optical elements can be used as the substrate of the optical film assembly according to the subject invention. The material of the substrate can be selected from a group consisting of, for example, but not limited to, the following: polycarbonate, polysulfonate, polystyrene, polyvinyl chloride, polyvinyl alcohol, polyester, polyethylene terephthalate, polyethylene naphthalate, and any combination of the previously listed materials.

The prismatic structure on the substrate of the subject invention can be formed using any method known by persons having ordinary skill in the art. For example, the prismatic structure can be formed on the substrate using imprint lithography while controlling the configured direction of the prismatic structure and the polarization of the substrate to form the first angle $\theta_1$.

In one embodiment of the optical film assembly of the subject invention, a second prismatic structure can be formed either directly onto the second surface of the substrate or separately. The configured direction of the second prismatic structure defines a second angle $\theta_2$ with respect to the polarization direction of the substrate, in which $0° \leq \theta_2 \leq 180°$. As defined above, it is clear that the configured direction of the second prismatic structure can conform to the polarization direction of the substrate; in other words, the second angle $\theta_2$ can substantially be 0° or 180°.

If the substrate of the optical film assembly according to the subject invention has a prismatic structure on its first surface as well as its second surface, the configured directions of the two prismatic structures should substantially be at a 90° angle (i.e., the included angle of the first angle $\theta_1$ and the second angle $\theta_2$) to attain superior effect.

The subject invention further provides a backlight module which comprises an aforementioned optical film assembly; a diffusion layer deposited under the optical film assembly; a LGP deposited under the diffusion layer; and a light source deposited alongside or under the LGP to generate sufficient light to the LGP for uniformizing light.

The above embodiments are further described with reference to FIG. 4 as well as FIG. 6.

Figure 4:
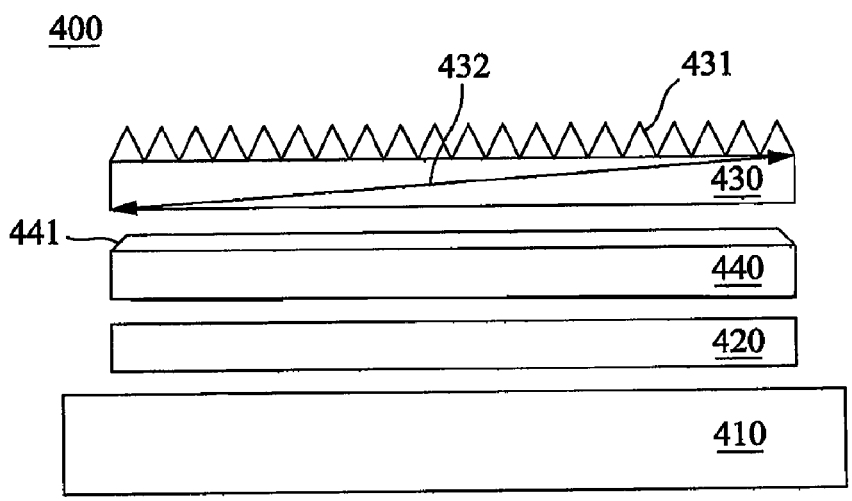
FIG. 4 is a schematic diagram of a combination of optical films in a backlight module according to the subject invention.

As shown in FIG. 4, a backlight module 400 comprises a LGP 410, a diffusion layer 420, and an optical film assembly 430. The LGP 410 is deposited on the bottom of the backlight module 400 to direct the backlight. According to the desired type of backlight module, the light source (not depicted) is deposited alongside the light guide 410 to constitute an edge-type backlight module. The light source can also be deposited under the LGP 410 to provide a direct-type backlight module.

The diffusion layer 420 is deposited above the LGP 410 to diffuse the light from the LGP 410 into the upper optical elements to improve the uniformity of the luminance. Any materials suitable for the diffusion layer known by persons having ordinary skill in the art of backlight module technology can be used in the diffusion layer 420. The material can be selected from a group consisting of, for example, but is not limited to, the following: polycarbonate, polysulfonate, polystyrene, polyvinyl chloride, polyvinyl alcohol, polyester, polyethylene terephthalate, polyethylene naphthalate, and any combination of the previously listed materials. If desired, the diffusion layer 420 can further comprise either a diffusing agent to enhance the efficiency of diffusing light or a diffusion composite film consisting of two or more films.

The optical film assembly 430 is deposited above the diffusion layer 420. The optical film assembly 430 has a polarization direction 432 and a first prismatic structure 431 on its first surface. The configured direction of the first prismatic structure 431 and the polarization direction 432 form an angle $\theta_1$ of 45°. As shown in FIG. 4, if another BEF 440, with a second prismatic structure 441 on one of its surface in a configured direction substantially perpendicular to that of the prismatic structure 441, is deposited under the optical film assembly 430, better luminance at the center will be attained. It should be noted that the BEF 440 is optional but not necessary. In addition, the BEF 440 can be directly formed onto the second surface of the optical film assembly 430 as desired (see the relevant description of FIG. 6 below).

As compared with the prior technology, the backlight module depicted in FIG. 4 comprises thinner optical materials and has lower costs. Furthermore, the display apparatus comprising such a backlight module exhibits superior optical performance to the prior technology and can optimize the luminance at each visual angle of the entire panel.

Figure 3:
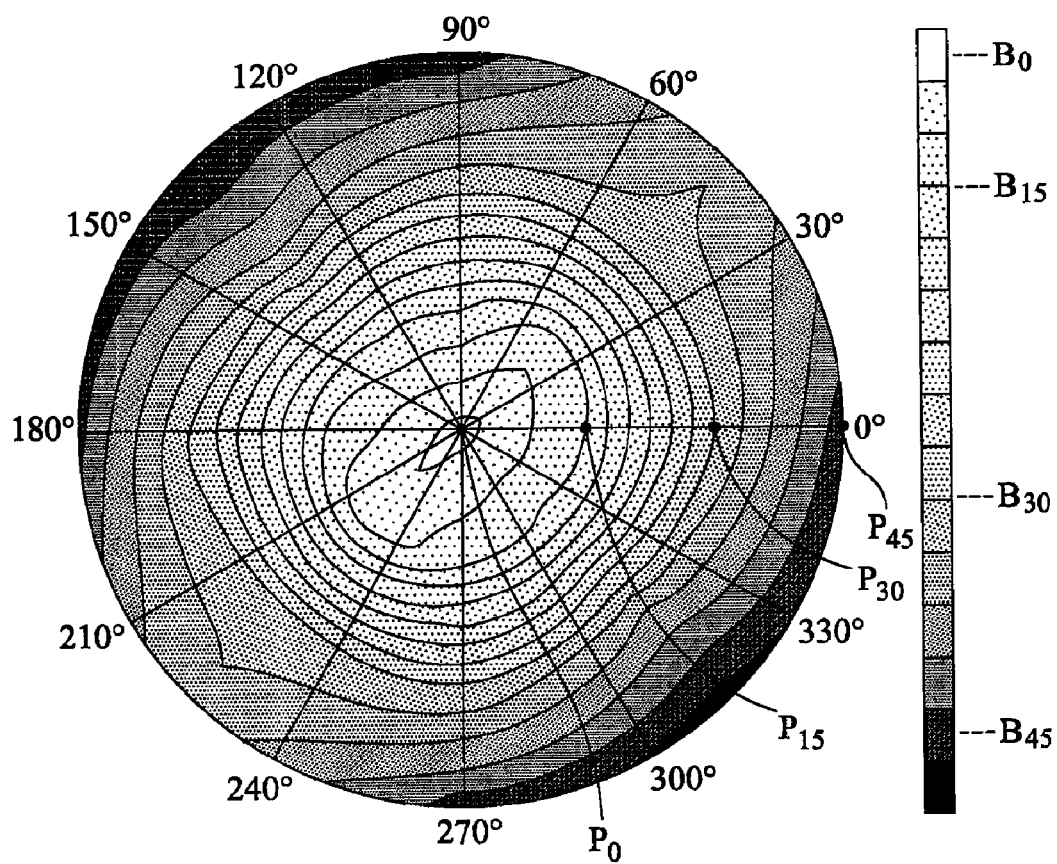
FIG. 3 shows the experimental results of the optical luminance of a backlight module according to the prior art.
Figure 5:
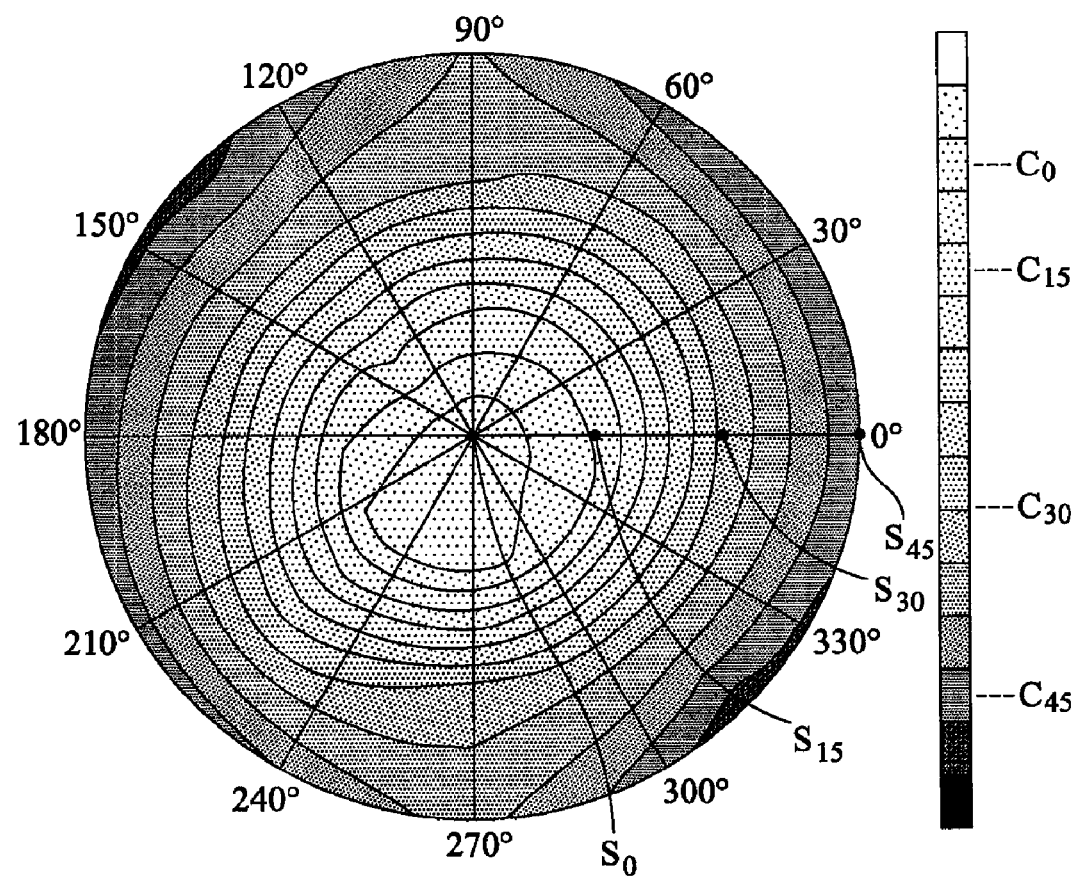
FIG. 5 shows the experimental results of the optical luminance of the backlight module depicted in FIG. 4.

As shown in FIG. 5, the positive X axial direction of the cross-locus is also used as an example for comparison with the prior art shown in FIG. 3. The observer measured the luminance of the panel center at the position $S_0$ perpendicular to the panel center. Then, the observer tiled his/her head with angles 15°, 30°, and 45° from the $S_0$ to the right side (i.e., the positive X axial direction) to get the positions $S_{15}$, $S_{30}$, and $S_{45}$, respectively. The luminance was then measured. The color levels (gray levels) measured at positions $S_0$, $S_{15}$, $S_{30}$, and $S_{45}$ correspond to those marked by $C_0$, $C_{15}$, $C_{30}$, and $C_{45}$, respectively, on the right color bar. The experiment charts show that the difference in luminance between the positions represented by $C_0$ and $C_{45}$ (i.e., the position perpendicular to the panel center and the position defining a 45° angle with respect thereto) is reduced. Thus, the luminance distribution is more concentrated. In addition, the luminance observed at position $S_{45}$ (i.e., viewing the panel with a 45° angle) is also significantly increased. As compared with the prior art shown in FIG. 3, the subject invention provides a great improvement in the entire luminance performance.

Figure 6:
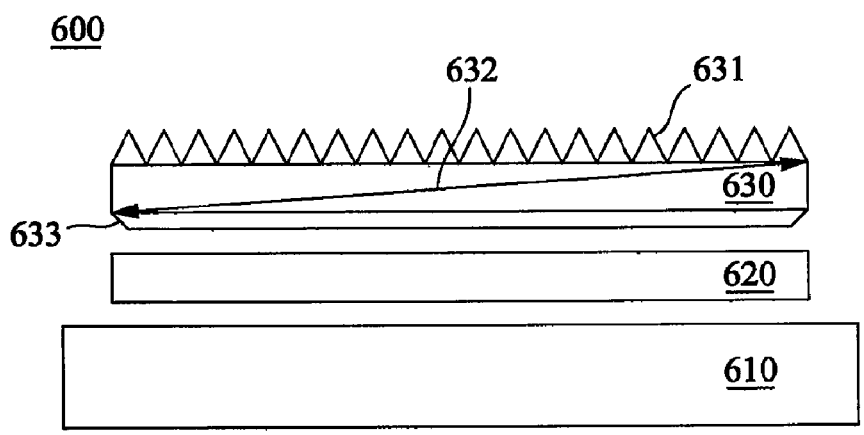
FIG. 6 is a schematic diagram of a combination of optical films in a backlight module according to another embodiment of the subject invention.

FIG. 6 shows another embodiment of the backlight module according to the subject invention. Like the aforementioned backlight module 400, the backlight module 600 comprises a LGP 610, a diffusion layer 620 deposited above the LGP 610, and an optical film assembly 630 according to the subject invention deposited above the diffusion layer 620. The optical film assembly 630 has a first prismatic structure 631 on its first surface and a second prismatic structure 633 on its second surface. The optical film assembly 630 also has a polarization direction 632. As explained above, the configured direction of the first prismatic structure 631 and the polarization direction 632 are at an angle $\theta_1$ of 45°, while the configured direction of the second prismatic structure 633 and the polarization direction 632 are at an angle $\theta_2$ of 135°.

The subject invention further provides a LCD apparatus which comprises a LCD panel, an aforementioned optical film assembly according to the subject invention deposited under the LCD panel, a diffusion layer deposited under the optical film assembly, a LGP deposited under the diffusion layer, and a light source deposited alongside or under the LGP for providing sufficient light thereto.

Since the LCD apparatus of the subject invention comprises the optical film assembly according to the subject invention, the luminance of the panel observed at any visual angle is optimized. In particular, by adjusting the first angle $\theta_1$, the polarization direction of the substrate of the optical film assembly substantially forms an angle with respect to the configured direction of the first prismatic structure. As a result, the reduction in luminance of the configured LCD apparatus at certain visual angles (i.e., on-axis viewing locus) is avoided, thereby attaining optimal visual luminance. Furthermore, the thickness of the optical film materials included in the LCD apparatus of the subject invention is thinner, and thus, the production cost is reduced.

The above disclosure is related to the preferred embodiments of the subject invention only. All the equivalent changes or modifications without departing from the spirit disclosed by the subject invention should also be covered in the following claims as appended.

What is claimed is:

1. An optical film assembly, comprising:
    a substrate with a polarization direction, which comprises a first surface and a second surface opposing thereto; and
    a first prismatic structure which is formed on the first surface with a certain configured direction, wherein the configured direction of the first prismatic structure defines a first angle $\theta_1$ with respect to the polarization direction of the substrate, in which $0°<\theta_1<180°$.

2. The optical film assembly of claim 1, wherein the first angle $\theta_1$ is between 5° and 175°.

3. The optical film assembly of claim 1, further comprising a brightness enhancement film (BEF) which is deposited under the substrate and faces the second surface.

4. The optical film assembly of claim 3, further comprising a second prismatic structure which is formed on the brightness enhancement film (BEF), thereby the second prismatic structure facing the second surface.

5. The optical film assembly of claim 4, wherein the second prismatic structure is in a certain configured direction, which defines a second angle $\theta_2$ with respect to the polarization direction, in which $0°<\theta_1<180°$.

6. The optical film assembly of claim 5, wherein the configured direction of the first prismatic structure and the configured direction of the second prismatic structure substantially form an included angle of 90°.

7. The optical film assembly of claim 1, further comprising a second prismatic structure formed on the second surface.

8. The optical film assembly of claim 7, wherein the second prismatic structure is in a certain configured direction, which defines a second angle $\theta_2$ with respect to the polarization direction, in which $0°<\theta_1<180°$.

9. The optical film assembly of claim 8, wherein the configured direction of the first prismatic structure and the configured direction of the second prismatic structure substantially form an included angle of 90°.

10. The optical film assembly of claim 1, wherein the substrate comprises a material selected from a group consisting of: polycarbonate, polysulfonate, polystyrene, polyvinyl chloride, polyvinyl alcohol, polyester, polyethylene terephthalate, polyethylene naphthalate, and a combination of any forgoing materials.

11. A backlight module, comprising:
    an optical film assembly of any one of claims 1 to 10;
    a diffusion layer deposited under the optical film assembly; and
    a light guide plate (LGP) deposited under the diffusion layer.

12. A liquid crystal display (LCD) apparatus, comprising:
    a liquid crystal display (LCD) panel;
    an optical film assembly of any one of claims 1 to 10 deposited under the liquid crystal display (LCD) panel;
    a diffusion layer deposited under the optical film assembly;
    a light guide plate (LGP) deposited under the diffusion layer; and
    a light source for providing light to the light guide plate (LGP).

* * * * *